March 19, 1929.  A. F. VICTOR  1,706,089
FILM FEED FOR CAMERAS
Filed Dec. 10, 1923   3 Sheets-Sheet 1
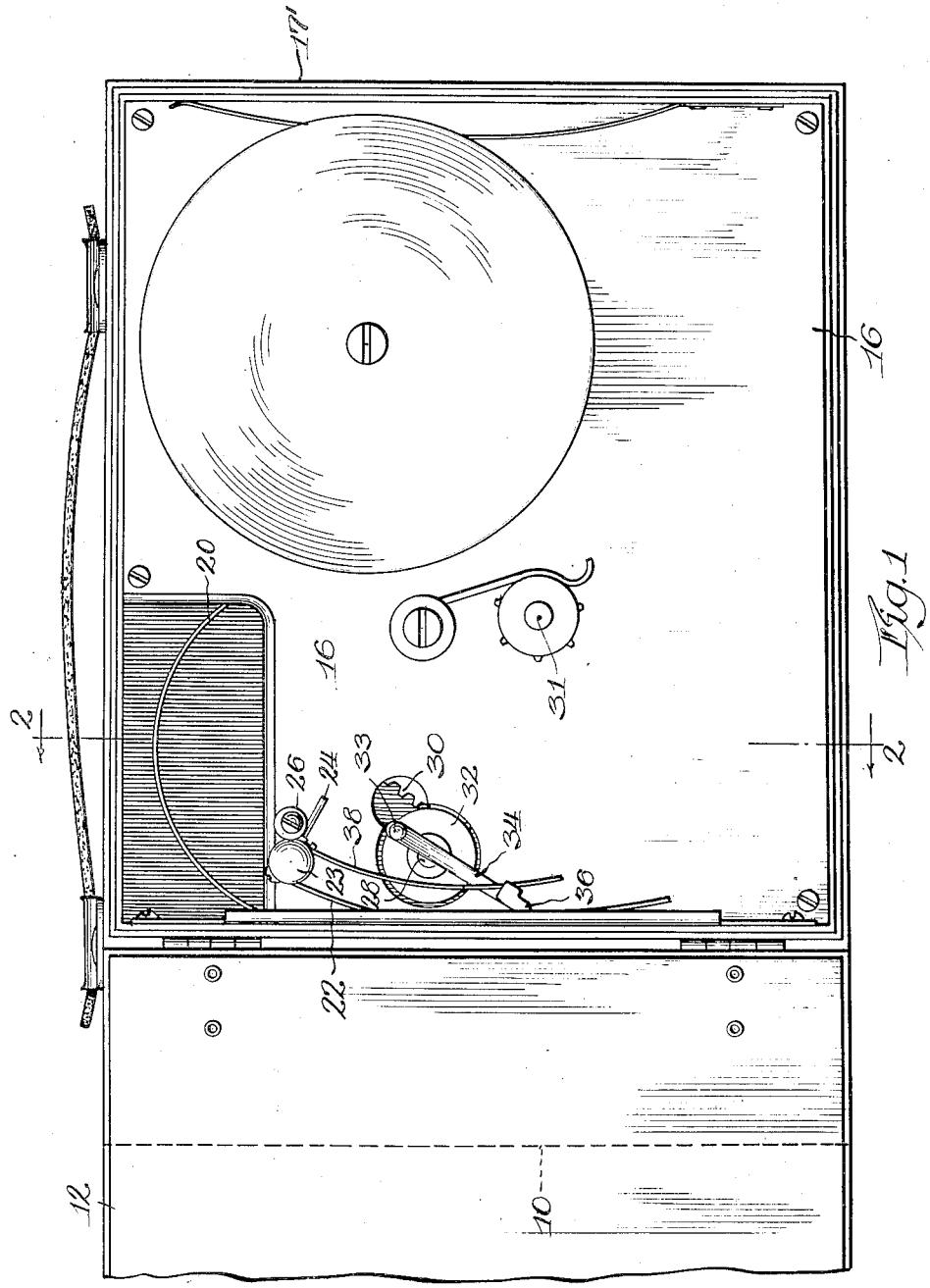

March 19, 1929.  A. F. VICTOR  1,706,089
FILM FEED FOR CAMERAS
Filed Dec. 10, 1923  3 Sheets-Sheet 2
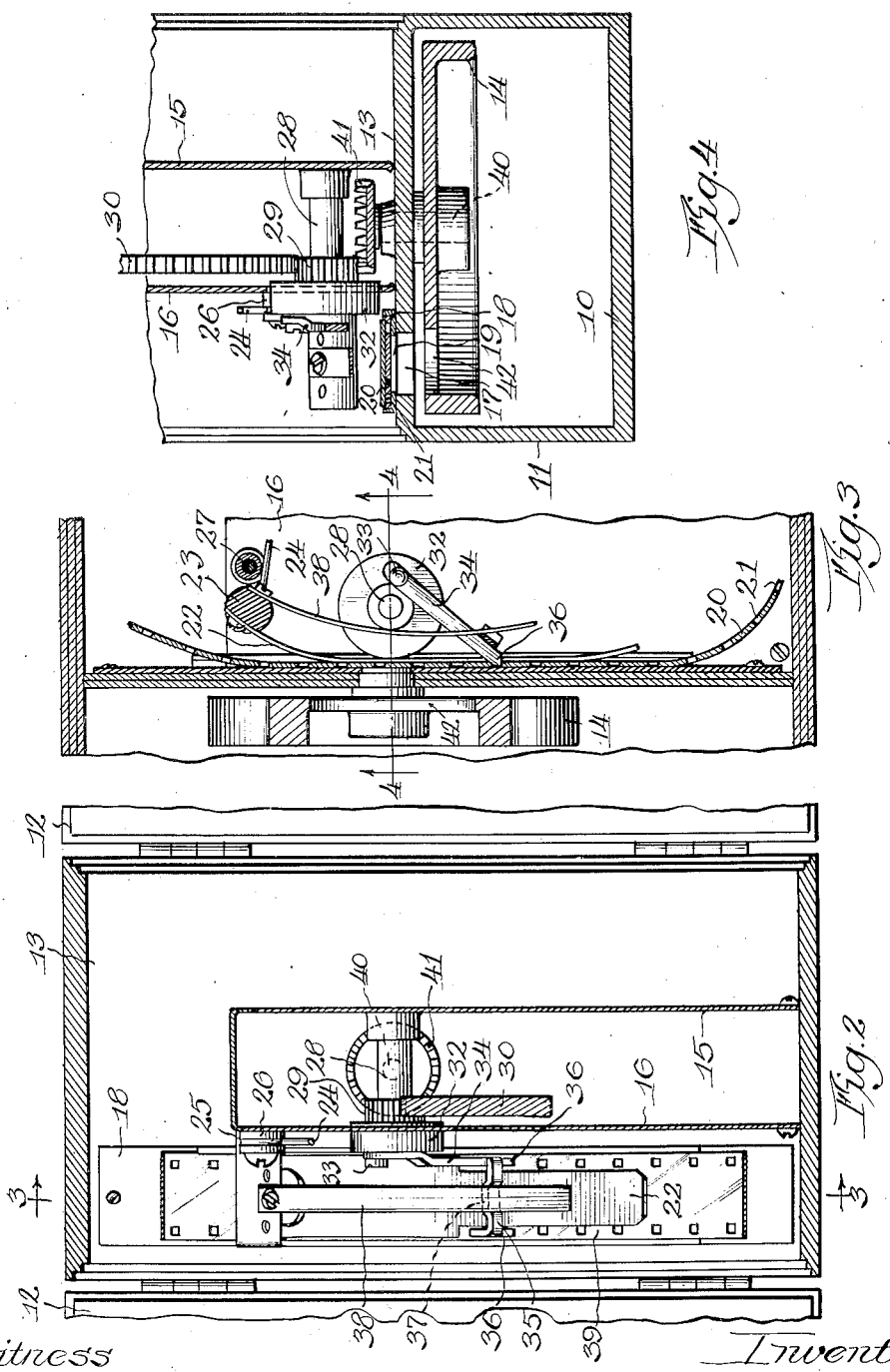

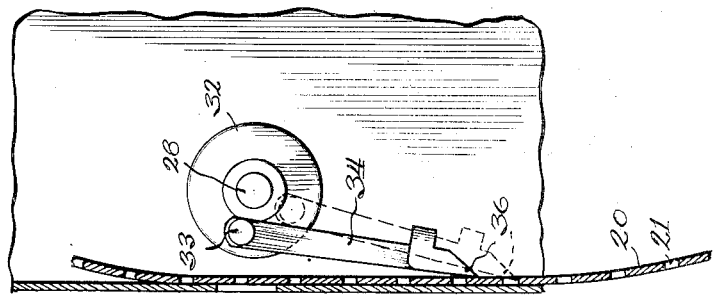
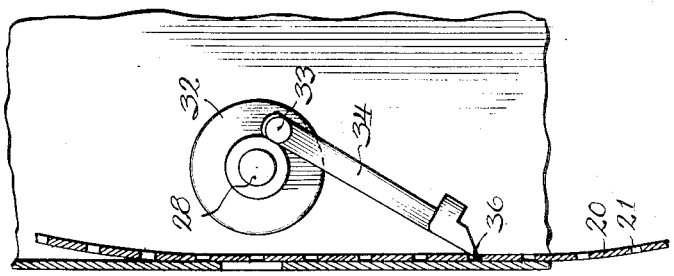
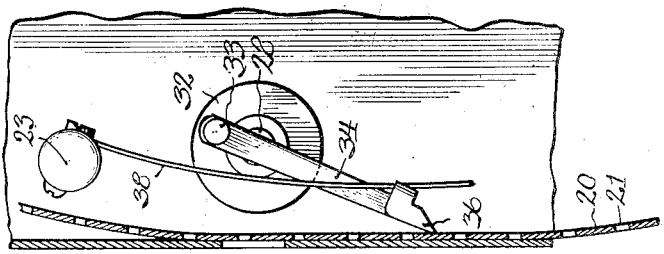

Patented Mar. 19, 1929.

1,706,089

UNITED STATES PATENT OFFICE.

ALEXANDER FERDINAND VICTOR, OF DAVENPORT, IOWA.

FILM FEED FOR CAMERAS.

Application filed December 10, 1923. Serial No. 679,799.

My invention relates to mechanism for feeding film intermittently through a cinematographic camera and has more particular reference to the shuttle or film engaging structure of such a mechanism by which the film is moved step by step past the aperture and lens of the camera.

An object of my invention resides in providing a film engaging and feeding device that is timed so that it will engage the perforations of the film successively and will permit periods of rest between the intermittent movements of the film that will be considerably greater than the time consumed in the actual movement of the film. In carrying out my invention I employ a film engaging shuttle which, after it moves out of one perforation, will slide along the film past the next perforation and reverse its movement and go forward to engage the perforation that had just been passed. Thus the structure consumes about three-fourths of the cycle of motion of the shuttle in disengagement with the film, with the film stationary, and only one-fourth of its cycle of motion in engagement with and moving the film. This permits the shutter of the camera to be opened for practically three-fourths of its revolution which permits a long exposure of the film. The structure I have herein disclosed is designed especially for use in motion picture cameras for use by amateurs, and the film moving mechanism is very small but is, nevertheless, extremely reliable and is made of a minimum of parts that are simple in construction and not liable to get out of order. It is therefore an object of my invention to provide a mechanism for intermittently moving the film that is compact in construction, dependable in operation, economical to manufacture, and novel in construction, and I prefer to carry out my invention and accomplish the aforesaid objects in substantially the manner hereinafter fully described.

Reference will now be made to the accompanying drawings that form a part of this specification in which Figure 1 is a side elevation of the interior portion of a motion picture camera showing the application of my invention thereto.

Fig. 2 is a vertical transverse section taken on line 2—2 of Figure 1.

Fig. 3 is a vertical longitudinal section of my invention, the view being taken on line 3—3 of Figure 2.

Fig. 4 is a horizontal longitudinal section taken on line 4—4 of Figure 3.

Figs. 5, 6 and 7 are diagrammatic views showing the relative position assumed by the film and the shuttle during the operation of the structure to move the film from one picture to the next succeeding picture.

The camera preferably comprises a box-like structure of convenient dimensions and has a front wall 10 from the ends of which extend rearwardly the short side walls 11 on each side, to the rear vertical edges of which latter are hingedly connected the longitudinally extending doors 12. Just back of the front wall 10, and extending across the box at about the location of the door hinges, is a transverse partition 13 that provides a shutter chamber in the front portion of the camera in which is rotatably mounted the counter-balanced shutter 14. Extending from the central portion of the transverse partition 13 is a suitable supporting structure consisting of spaced plates 15 and 16 that extend parallel to each other from said partition to the rear wall 17' of the camera, thus dividing the interior of the same into side-by-side chambers. Intermediate the plate 16 and the adjacent door of the camera the partition 13 is provided with an aperture 17, and mounted upon the said partition and vertically disposed thereon is a film guide plate 18 that is of channel shape in cross-section, as seen in Figure 4, and opposite the location of the aperture 17 in the partition said guide plate is provided with an aperture 19 that is in registry therewith. The film 20 is provided with marginal perforations 21 that are spaced apart the height of the pictures that will be produced thereon after the film has been developed, and the film is held in frictional contact with the guide plate by means of a presser plate 22. This presser plate 22 is a length or strip of spring metal that has its upper end secured to a rotatable stud 23 mounted upon the adjacent plate 16 of the supporting element. The presser plate 22 is bowed slightly when being assembled with the stud as seen in the drawing to provide a light tension and is maintained in this manner by means of a pin 24 projecting laterally from the stud 23 into the groove 25 formed in the periphery of a disk 26 mounted upon the plate 16 adjacent the stud 23. This disk 26 is eccentrically mounted upon a screw 27 so that by loosening the latter and rotating the disk the pin may be positioned closer or farther away from the axis of the screw to increase or diminish the bow of the spring and thereby modify the tension of the presser plate upon the film. The presser plate 23 it will be understood, is a straight piece of spring metal, and, owing to its being bent into the bowed shape, the tendency is to straighten out, but this is prevented by the engagement of the pin 24 with the disk 26.

Journalled in the bearings in the plates 15 and 16 and projecting beyond the latter plate is a stub-shaft 28 that carries a pinion 29 thereon and is in mesh with a large gear 30 carried by the rotatable driven shaft 31. The driven shaft 31 derives its motion from suitable gearing or other means that is actuated by a crank upon the exterior of the camera in order to rotate the pinion 29 at a high speed. Secured upon the extended end of shaft 28 outside the plate 16, is a rotatable disk 32 from the face of which projects an eccentric pin 33, the latter being operatively connected to the film actuating shuttle by this eccentric pin 33 by a pitman or link 34 so that there is a reciprocatory movement of the shuttle each time the disk 32 is rotated. This shuttle consists of a cross-piece 35, the ends of which are bent laterally and are tapered or pointed to provide film engaging fingers 36. Intermediate its length the cross-piece 35 is provided with a depression 37 into which is disposed the adjacent end portion of a spring element 38. The opposite end of the spring element 38 is connected to the stud 23 in such manner that the spring element 38 is bowed as seen in Figure 3 of the drawings and exerts pressure against the cross-piece of the shuttle to maintain it in contact with the film. The lower portion of the presser plate 22 is cut away upon its longitudinal sides or reduced in width as seen at 39 (Figure 2) to uncover a portion of the perforations in the film so that the film engaging fingers 36 of the shuttle may operate outside of this reduced portion and engage with the perforations in the film. The structure is so arranged and timed that a complete revolution of the disk 32 will move the film to the succeeding portion of the film where it is desired to photograph the next picture, and the film perforations are disposed between the respective pictures. The distance traveled by the eccentric pin 33 in its path when the disk is rotated is such that the fingers 36 of the shuttle after leaving one perforation will move upwardly beyond the next perforation and nearly to the third perforation before they start a downward or return movement, and they then travel downward a slight distance until they enter the second perforation or perforation over which they have just previously moved, and the further downward travel of the shuttle will shift it to its next position. In other words, as seen in Figures 5, 6 and 7, the film will be moved during practically only one-fourth of a revolution of the disk 32, while the remaining portion of the revolution is consumed in moving the shuttle and its fingers upwardly past the second perforation and then returning it thereto for the purpose of engagement and for moving the film.

In order to synchronize the film moving mechanism with the shutter 14, I have mounted the latter upon a suitable shaft 40 that extends transversely through the partition wall 13 at a right angle to shaft 28 and has the shutter 14 secured to one end, while the opposite end has secured to it a crown gear 41 that is in mesh with the pinion 29 carried by the stub shaft 28 heretofore mentioned. The shutter may be of any desired construction and rotates in front of the aperture of the camera and is provided with a segmental slot or cut-out portion 42 through which the exposure is made upon the film. This segmental slot may be of considerable length owing to the fact that the film remains stationary during practically three-fourths of the revolution of the disk 32 and the film is in motion only during a fourth of a revolution of the disk or the distance from the position shown in Figure 6 to the position shown in dotted lines in Figure 7. I weight the peripheral portion of the shutter, and on account of its rapid rotation the same will perform the function of a balance-wheel for the other operating portions of the mechanism and permits of a more even movement thereof.

The structure, as seen in the drawings, is extremely compact and requires but a minimum of parts for operating the film in its step-by-step or intermittent movement past the aperture. The structure is also very simple so that persons unfamiliar with motion picture photography may readily thread the film into the film guide and no matter where the perforations in the film may be positioned the first rotation of the disk or complete movement of the shuttle will move the film ribbon downwardly a sufficient distance to position it correctly for the proper spacing of the subsequent exposures and pictures.

What I claim is:—

1. In mechanism for intermittently feeding perforated film, a support having a guide to receive the film, means for maintaining the film in said guide, a film-engaging fork the ends of the fingers of which constantly engage the film along the lines of perforations, a rotatable disk, a wrist-pin thereon, an arm extending from said fork and supported at one end by said wrist-pin, and a yieldable device bearing upon said fork whereby to maintain the latter in yieldable contact with the film.

2. In mechanism for intermittently feeding preforated film, a support having a guide to receive the film a rotatable stud mounted on said support adjacent said guide a spring presser plate mounted on said stud and yieldingly engaging the film in said guide, a film-engaging fork the ends of the fingers of which constantly engage the film along the lines of perforations, a crank device to which said fork is connected, the rotation of which device reciprocates the fork upon the film to cause the fingers to engage the perforations and move the film, and a yieldable device bearing upon said fork whereby to maintain the latter in yieldable contact with the film.

3. In a mechanism for intermittently feeding perforated film, a support having a guide to receive the film, a rotatable stud mounted on said support adjacent said guide, a spring presser plate carried by the stud and yieldingly engaging the film in the guide, a film engaging fork, means to reciprocate said fork to move the film, and means supported by the stud for maintaining the fork in yielding contact with the film.

4. In a mechanism for intermittently feeding perforated film, a support having a guide to receive the film, a rotatable stud mounted on said support adjacent said guide, a spring presser plate carried by the stud and yieldingly engaging the film in the guide, a film engaging fork, means to reciprocate said fork to move the film, and a leaf spring carried by the stud and engaging the fork to yieldingly maintain the latter in contact with the film.

5. In a mechanism for intermittently feeding perforated film, a support having a guide to receive the film, a rotatable stud mounted on said support adjacent said guide, a spring presser plate carried by the stud and yieldingly engaging the film in the guide, a film engaging fork, means to reciprocate said fork to move the film, a leaf spring carried by the stud and engaging the fork to yieldingly maintain the latter in contact with the film, and means associated with the stud for adjusting the tension of said spring and presser plate.

Signed at Davenport, county of Scott and State of Iowa, this 6th day of December, 1923.

ALEXANDER FERDINAND VICTOR.